US007273221B2

(12) United States Patent
Ockenden (10) Patent No.: US 7,273,221 B2
(45) Date of Patent: Sep. 25, 2007

(54) ATTACHMENT SYSTEM FOR BICYCLE ACCESSORIES

(75) Inventor: Lynn Marie Ockenden, Minneapolis, MN (US)

(73) Assignee: Transbike Systems, Inc., Minneapolis, MN (US)

( * ) Notice: Subject to any disclaimer, the term of this patent is extended or adjusted under 35 U.S.C. 154(b) by 156 days.

(21) Appl. No.: 10/499,427

(22) PCT Filed: Dec. 20, 2002

(86) PCT No.: PCT/US02/40922

§ 371 (c)(1),
(2), (4) Date: Oct. 1, 2004

(87) PCT Pub. No.: WO2004/058561

PCT Pub. Date: Jul. 15, 2004

(65) Prior Publication Data

US 2005/0058727 A1    Mar. 17, 2005

Related U.S. Application Data

(60) Provisional application No. 60/342,917, filed on Dec. 20, 2001, provisional application No. 60/369,491, filed on Apr. 1, 2002.

(51) Int. Cl.
*B62J 7/00* (2006.01)
*B62J 39/00* (2006.01)
(52) U.S. Cl. .................. 280/288.4; 224/422; 224/423; 224/424
(58) Field of Classification Search ............. 280/288.4; 224/422, 423, 424, 425
See application file for complete search history.

(56) References Cited

U.S. PATENT DOCUMENTS 1,510,603 A * 10/1924 Pawsat ..................... 280/152.1

(Continued)

FOREIGN PATENT DOCUMENTS

CN        98803556.1       4/2000

(Continued)

*Primary Examiner*—Lesley D. Morris
*Assistant Examiner*—Marc A. Scharich
(74) *Attorney, Agent, or Firm*—North Oaks Patent Agency; Shawn B. Dempster (57) ABSTRACT

A system for attaching bicycle accessories to the frame of a bicycle is herein disclosed. The system comprises at least two of an upper mount, a lower mount, and a support arm. The upper mount is generally secured to the frame of the bicycle adjacent the junction of the seat post and seat stay of a bicycle frame. The upper mount includes a channel for receiving a first portion of a bicycle accessory. A lower mount generally includes at least one mounting post that extends generally upward from a front or rear dropout of a bicycle frame. The mounting post is adapted to secure a second portion of a bicycle accessory to the frame of the bicycle. The support arm is constructed and arranged to couple a front fork or a seat stay of a bicycle frame to the accessory so as to create a rigid structural relationship between the accessory and the bicycle frame. The attachment system of the present invention may be adapted for attaching accessories to rigid bicycle frames or to bicycle frames that include suspensions. A towing hitch structure may also be included in the system.

29 Claims, 7 Drawing Sheets

U.S. PATENT DOCUMENTS

| | | | | |
|---|---|---|---|---|
| 1,581,827 A | * | 4/1926 | Beck, Jr. | ................. 280/152.1 |
| 2,128,174 A | * | 8/1938 | Smith | ......................... 224/433 |
| 2,457,624 A | * | 12/1948 | Aleks | ......................... 224/431 |
| 2,583,550 A | | 1/1952 | Dennis | |
| 2,755,103 A | | 7/1956 | Douglas | |
| 3,795,354 A | | 3/1974 | Stippich | |
| 3,827,613 A | | 8/1974 | Meyer | |
| 4,023,820 A | | 5/1977 | Rizzo | |
| 4,155,231 A | | 5/1979 | Zane et al. | |
| 4,282,993 A | * | 8/1981 | Humlong | ..................... 224/431 |
| 4,313,548 A | * | 2/1982 | Edelson | ...................... 224/438 |
| 4,328,915 A | | 5/1982 | Melton | |
| 4,342,467 A | | 8/1982 | Kester | |
| 4,418,850 A | | 12/1983 | Jackson | |
| 4,438,942 A | * | 3/1984 | Hon | .......................... 280/278 |
| 4,440,331 A | | 4/1984 | Schimmels | |
| 4,479,662 A | | 10/1984 | Defour et al. | |
| 4,537,338 A | | 8/1985 | Belka | |
| 4,545,224 A | | 10/1985 | Zane | |
| 4,577,786 A | | 3/1986 | Dowrick | |
| 4,690,420 A | | 9/1987 | Belka | |
| 4,721,320 A | | 1/1988 | Creps et al. | |
| 4,840,298 A | | 6/1989 | Belka | |
| 4,883,283 A | | 11/1989 | Hazelett | |
| 4,928,985 A | | 5/1990 | Nowlin | |
| 5,039,120 A | | 8/1991 | Stowe | |
| 5,090,717 A | | 2/1992 | Belka | |
| 5,092,142 A | | 3/1992 | Zane et al. | |
| 5,100,162 A | * | 3/1992 | Lo | ........................... 280/281.1 |
| 5,240,266 A | | 8/1993 | Kelley | |
| 5,332,134 A | | 7/1994 | Chen | |
| 5,344,170 A | * | 9/1994 | Ochoa | ........................ 280/283 |
| 5,395,130 A | | 3/1995 | Rubin | |
| 5,410,893 A | | 5/1995 | Easterwood | |
| 5,470,088 A | | 11/1995 | Adams | |
| 5,470,092 A | | 11/1995 | Fardy | |
| 5,542,587 A | | 8/1996 | Broz et al. | |
| RE35,335 E | | 9/1996 | Calfee | |
| 5,588,661 A | | 12/1996 | Wolfe | |
| 5,678,839 A | | 10/1997 | Pobud, Jr. et al. | |
| 5,803,329 A | * | 9/1998 | Weissenberger et al. | .... 224/450 |
| 5,842,535 A | * | 12/1998 | Dennis | ...................... 180/205 |
| 5,931,631 A | | 8/1999 | Schwimmer | |
| 5,975,549 A | | 11/1999 | Ockenden | |
| 6,227,556 B1 | | 5/2001 | Ockenden | |
| 6,234,503 B1 | | 5/2001 | Ockenden | |
| 6,260,931 B1 | | 7/2001 | Stewart | |
| 6,398,247 B1 | * | 6/2002 | Kuo | ........................ 280/288.4 |
| 6,431,422 B1 | | 8/2002 | Moore et al. | |
| 6,554,307 B1 | | 4/2003 | Ockenden | |
| 6,843,456 B1 | | 1/2005 | Hajianpour | |
| 2002/0125679 A1 | * | 9/2002 | Jung | ....................... 280/288.4 |
| 2003/0071185 A1 | | 4/2003 | Casapulla | |
| 2004/0065706 A1 | | 4/2004 | Starks | |

FOREIGN PATENT DOCUMENTS

| | | |
|---|---|---|
| DE | 4101745 A1 | 7/1992 |
| DE | 4416124 A1 | 11/1995 |
| JP | 2001-010570 * | 1/2001 |
| NI | 142543 | 10/2001 |

* cited by examiner

ATTACHMENT SYSTEM FOR BICYCLE ACCESSORIES

CROSS REFERENCE TO RELATED APPLICATIONS

This application claims the benefit of Provisional Application Ser. No. 60/342,917 filed Dec. 20, 2001 and Provisional Application Ser. No. 60/369,491 filed Apr. 1, 2002, and priority to International PCT Application Serial No. PCT/US02/040922, filed Dec. 20, 2002.

FIELD OF THE INVENTION

The present invention relates generally to apparatus for mounting one or more accessories to a bicycle. More particularly, this invention pertains to a system for interchangeably mounting a variety of accessories, either alone or in simultaneous combination, to a bicycle frame.

BACKGROUND OF THE INVENTION

There are many accessories that are currently useful to bicyclists. These include removable fenders over the front and/or rear wheels, bicycle cargo carrying racks that may be positioned over either wheel, cargo-carrying racks with integral baskets, saddlebags or panniers-that are generally mounted on a cargo-carrying rack and even small trailers for carrying children or other cargo. Recently, electric motors and generators have become popular additions to the bicycle.

While all of the above-indicated accessories are known and available on the market, each accessory typically has its own mounting system by which it is attached to the bicycle. At times, the mounting system of one available accessory makes simultaneous mounting of other accessories difficult, inconvenient, or impossible. Generally, the various accessory mounts are incompatible.

Bicycle accessories of the type described above are typically secured to the frame of a bicycle using threaded fasteners driven into a braze-on, metal straps that are passed around the frame, pipe clamps, U-bolts, and the like. While these means for attaching accessories to a bicycle do have utility, they are not "quick-release". Furthermore, other than the braze-on, these attachment means are not part of the bicycle frame itself and rely on a clamping-type mechanical grip that may fail, thereby releasing the accessory or damaging the bicycle frame or its finish. Braze-ons are themselves relatively limited in their location and number.

These attachment means are also not very adaptable. Where a member of a bicycle frame is not in an assumed orientation or where the frame member is of a different size or shape, the aforementioned prior art accessory attachment means may not easily be modified to accommodate common variations in bicycle frame size and shape.

Many bicycles currently on the market also incorporate front and/or rear suspension systems that can make it difficult to attach accessories to a bicycle. This creates serious problems in the attachment of accessories to a bicycle frame, as the traditional points of attachment may be in different frames of reference vis-à-vis the frame and the suspension.

Finally, typical prior art accessory attachment means are not generally able to withstand rigorous loading conditions. Heavy loads, such as those seen in long distance touring bicycles and in work bicycles, may easily exceed the holding abilities of most, if not all, of the aforementioned accessory attachment means. The points of attachment are only as sturdy as the mechanical fastener used to secure mounting apparatus to the frame of the bicycle.

Accordingly, it is an objective of the present invention to provide a comprehensive and uniform system for attaching accessories directly to a bicycle frame. It is another object of the invention to provide a strong and flexible means for attaching any number of accessories to a bicycle frame.

SUMMARY OF THE INVENTION

The objectives of the present invention are realized in a system for attaching an accessory to a bicycle frame that in one embodiment comprises an upper mount that is secured to the bicycle frame adjacent the intersection of a seat stay and a seat tube of the bicycle frame and a lower mount that comprises at least one post that extends generally upward from the rear dropout of the bicycle frame. The upper mount of this system comprises a channel that is arranged generally perpendicular to the frame of the bicycle such that the channel creates a hard point attachment for a first portion of the accessory. Similarly, the post extending generally upward from the rear dropout of the bicycle creates a hard point attachment for a second portion of the accessory. The post that extends from the rear dropout may be formed integral with that dropout or may be retrofit as by bolting or welding to the dropout.

Typically, the mounting post will be taller than it is wide, however it is envisioned that the post aspect could be reversed such that the post is wider than it is tall. In addition to size, the post may vary in its shape and may be flat, round, hollow, solid, mushroom shaped, tapered, or it may be L- or T-shaped as well. In other embodiments, the posts extending from the dropout will include a notch, aperture, detent, or other engagement structure that would allow an accessory to be securely coupled thereto. Another embodiment of the post includes an engagement structure that is a circumferential or lateral groove formed into a cylindrical or prismatic post.

One accessory that is commonly attached to a bicycle and which may readily be adapted for use with the attachment system of the present invention is a luggage rack. The luggage rack is typically supported upon one or more legs having a distal end that is adapted to be received either in or around the mounting post that extends from the dropout of the bicycle frame. While it is possible that a retention mechanism may be associated directly with the post, it is preferable to provide the distal end of the accessory leg with a retention mechanism that will permit the accessory leg to be securely coupled to the frame of the bicycle at the post. Examples of retention mechanisms include a captured, resiliently biased ball that engages the engagement structure of the post, a resiliently biased lever having a free end that engages the engagement structure of the post, a removable pin such as a cotter pin, roll pin, or simple draw pin that engages the engagement structure of the post, a push button, or a thumb screw that engages a threaded engagement structure of the post. Alternatively, the distal end of the accessory leg and the post can be constructed and arranged to fit together in an interference fit or a tapered, wedging fit.

The attachment system of the present invention may also include a towing hitch structure for towing a trailer behind a bicycle. Such a towing hitch structure is secured to the frame of the bicycle adjacent the juncture of the seat stay and the chain stay near the dropout of the frame. The towing hitch structure comprises a plate than spans the region between the seat stay and the chain stay and has a bore for receiving a hitch pin formed therein. A locking channel is formed through the plate in such a manner that the locking channel will intersect the bore formed through the plate. The locking channel is positioned such that a key or similar structure inserted into the locking channel will engage a groove formed around a hitch pin so as to releasably retain the hitch pin in the bore.

Because the size and configuration of accessories that may be used with a bicycle will vary greatly, the position and orientation of the upper mount and the mounting posts may be varied as well. Specifically, the upper mount is preferably positioned at a location that is adjacent to the intersection of the seat stay and the seat tube of the bicycle frame. However, while remaining adjacent to the aforementioned junction, the channel of the upper mount may in fact be slightly above the intersection of the seat stay and seat tube, substantially level with the intersection of the seat stay and seat tube, or below the level of the intersection of the seat stay and seat tube. In addition, the upper mount may be formed integrally with the frame of the bicycle or may be retrofit thereto. Typically, the upper mount comprises a channel that is supported on a cantilever arm that is itself secured to the frame of the bicycle as described hereinabove. This cantilever arm may also be aided by an angled support that extends between the frame of the bicycle and the channel or the distal end of the cantilever arm to add further strength to the upper mount.

In order to accommodate accessories of different shapes and sizes, the channel of the upper mount may have many different shapes. Examples of suitable shapes for the channel include circular, oval, square, rectangular, triangular, curvilinear, and rectilinear. Preferably, a portion of an accessory will be adapted to conform generally to the shape of the channel of the upper mount, though it is to be understood that accessories having shapes dissimilar to that of the channel of the upper mount may be utilized as well.

The structure of the upper mount as disclosed herein is sufficiently flexible in its application that it may become an accessory in its own right. Where so desired, a channel may be secured to a rear portion of an accessory such as a bicycle rack so as to secure additional accessories or items to the rear portion of that bicycle rack.

In order to secure the first portion of an accessory within the channel of the upper mount, the upper mount is typically provided with a catch or retention mechanism that may comprise a hinged cover that is lockably closed over the channel to retain the first portion of an accessory therein. A suitable catch may comprise a rotatable cantilever bar or a hinged plate that can be moved into a position above the channel of the upper mount to retain the first portion of the accessory in the channel. It is to be understood that the system of the present invention may be utilized to attach many types of accessories to a bicycle frame. Examples of such accessories include bicycle luggage racks, fenders, reflectors, tow hitches, training wheels, pannier supports, child seats, baskets, lights, generators, and motors.

In an alternate embodiment of the present invention, the attachment system may comprise the upper mount described hereinabove in combination with a rigid support arm that is secured between a seat stay of the bicycle frame and the accessory. The support arm forms a substantially rigid structural member with the accessory and the seat stay so as to rigidly support and secure the accessory to the bicycle frame. The rigid support arm typically comprises a first end and a second end that is separated by a middle portion. The first end of the support arm is adapted to be rotatably secured to the bicycle accessory. The second end of the rigid support arm is adapted to be secured to the seat stay of the bicycle frame. One means for attaching the rigid support arm to the seat stay is to utilize a clamping mechanism at the second end of the rigid support. Another means for attaching the second end of the rigid support to the frame of the bicycle is to utilize a fastener that may be threaded into the brake mechanism associated with the rear wheel of the bicycle. This type of fastener not only secures the brake mechanism in its operative position, but also rigidly couples the accessory to the bicycle frame. The middle portion of the support arm is preferably adjustable in length, and may include telescoping means or a threaded adjusted means for modifying the length of the support arm.

Yet another embodiment of the present invention comprises the use of a mounting post and a rigid support to secure an accessory to the bicycle frame. This embodiment of the attachment system of the present invention is particularly useful for securing accessories to front and rear suspensions of a fully suspended bicycle frame, as the attachment of the accessory solely to the suspension members themselves allows the accessories to be maintained in the same frames of reference as the respective suspension mechanisms.

It is to be understood that the accessory mounting posts of the present invention may be formed integral with the front or rear dropout of a bicycle frame or may be retrofit thereto. One embodiment of the mounting posts that may be retrofit to a dropout includes a relatively planar mounting plate from which extends one or more mounting posts. The mounting plate includes one or more holes formed therethrough that are substantially aligned with preexisting holes formed through the dropout of the bicycle frame. The mounting plate, and subsequently the mounting posts, is attached to the dropout by use of a threaded fastener, a metallic weld, or an adhesive. The mounting posts themselves can be said to comprise an improvement over typical prior art bicycle dropouts. These accessory mount posts represent hard point connections directly to the frame of a bicycle. Accessory mounting legs that are constructed and arranged to mate with the accessory mounting posts are an essential part of the attachment system of the present invention. Providing multiple mounting posts on a dropout of a bicycle provides the opportunity to secure multiple accessory mounting legs to the bicycle frame at the dropout, again increasing the flexibility of the attachment system of the present invention.

As the mounting posts comprise a hard point connection for accessories to a bicycle frame, it is preferred that the mounting posts mate with the ends of accessory legs at a point that is adjacent to the dropout itself. Typically, this point of connection is within one to three inches of the dropout itself, but in any case the connection between the mounting post and the accessory leg is made at a distance from the dropout that is less than the radius of the wheel mounted in the dropout. Again, it should be stated that the mounting post is a hard point connection for an accessory to a bicycle and is therefore considered to be part of the bicycle frame itself. These mounting posts, and for that matter, the upper mount, are not to be considered accessories in and of themselves as they are effectively parts of the bicycle frame.

These and other objectives and advantages of the invention will appear more fully from the following description, made in conjunction with the accompanying drawings wherein like reference characters refer to the same or similar parts throughout the several views.

DESCRIPTION OF THE DRAWINGS

FIGS. 8a-8e schematically illustrate various cross sectional shapes of the channel of the upper mount;

FIGS. 15a-15g are cross sections of the mounting post of FIG. 14 as viewed along cutting lines 15-15 of FIG. 14;

FIGS. 16a-16h are partial schematic side views of mounting posts of varying shape;

FIGS. 17a and 17b are partial rear views of a flat and a notched mounting post, respectively;

FIGS. 18a and 18b are partial rear views of a mounting post with a lateral protrusion and a mounting post having a three dimensional shape, respectively;

FIGS. 23a-23d is an end view of a partial cross section of a bicycle dropout having a notched mounting post with an accessory leg received thereon;

DETAILED DESCRIPTION

Although the disclosure hereof is detailed and exact to enable those skilled in the art to practice the invention, the physical embodiments herein disclosed merely exemplify the invention, which may be embodied in other specific structure. While the preferred embodiment has been described, the details may be changed without departing from the invention, which is defined by the claims.

Figure 1:
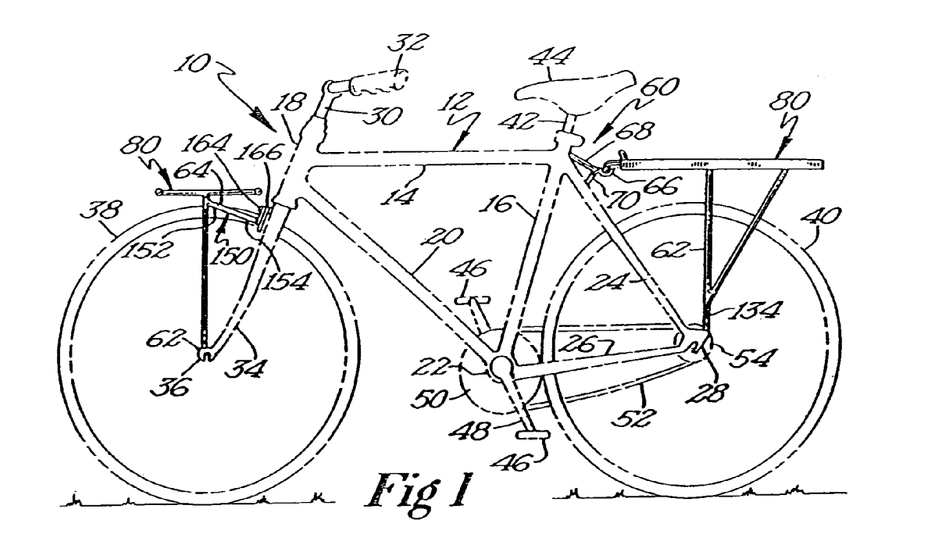
FIG. 1 is an elevation of a bicycle having a bicycle rack secured thereto by means of an upper mount and a mounting post.

FIG. 1 illustrates a standard bicycle 10 that incorporates the attachment system of the present invention. The bicycle 10 comprises a frame 12 of standard configuration that is made up of a plurality of frame members. While the shape, size, and orientation of the respective frame members may vary with the make of the bicycle, a standard bicycle frame 12 is composed of a top-tube 14 that is coupled between a seat tube 16 and a head tube 18. The seat tube 16 receives telescopically therein a seat post 42 that supports the seat 44. A down tube 20 extends between the lower end of the head tube 18 and the bottom bracket 22. The lower end of the seat tube 16 is also connected to the bottom bracket. The rear of the frame 12 comprises a seat stay 24 and a chain stay 26. The seat stay 24 extends from adjacent the intersection of the top tube 14 and the seat tube 16 downwardly into the rear of the frame 12 so as to intersect with a dropout 28. The chain stay 26 is connected between the dropout 28 and the bottom bracket 22. Note that the various frame members 14-28 are typically connected to one another via welding or similar processes where the frame 12 is fashioned of a metallic substance, though they may be connected by the use of an adhesive where the frame members are fashioned from a composite material.

The head tube 18 has received therethrough a headset 30. The handlebars 32 of the bicycle 10 are secured to the upper end of the headset 30. The lower end of the headset has secured thereto the front fork 34. At the lower end of the front forks are a simplified front dropout 36 that supports the front wheel 38. The rear wheel 40 is similarly supported in the rear dropout 28.

Motive power for the bicycle 10 is provided by means of the pedals 46 that are supported on crank arms 48. The crank arms 48 pass through the bottom bracket 22 and are rotatably supported therein. A chain wheel 50 is secured to the crank arms and rotates therewith. A chain 52 shown in FIG. 1 as a dashed line passes around the chain wheel 50 and a smaller chain wheel 54 that is mounted on the rear axle of the rear-wheel 40.

Figures 2, 3A:
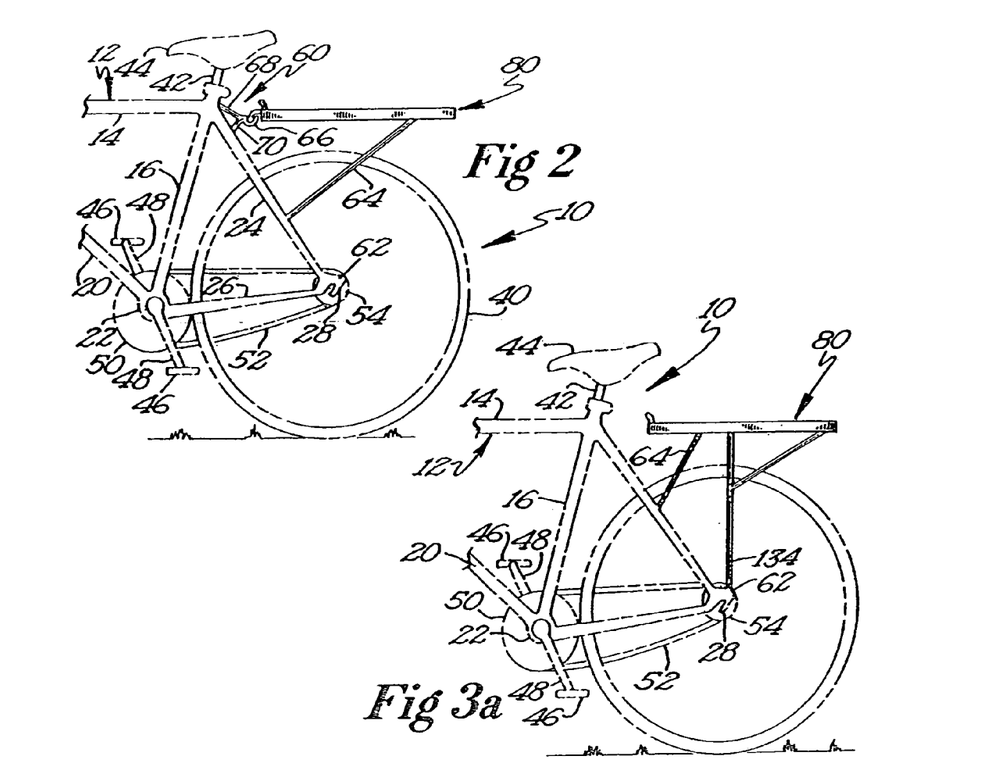
FIG. 2 is partial elevation of a bicycle having a bicycle rack secured thereto by means of an upper mount and a support arm.
FIG. 3a is partial side view of a bicycle having a bicycle luggage rack secured thereto by means of a support arm and a mounting post, the support arm being connected between the bicycle frame and horizontal portion of the bicycle luggage rack.
Figure 6A:
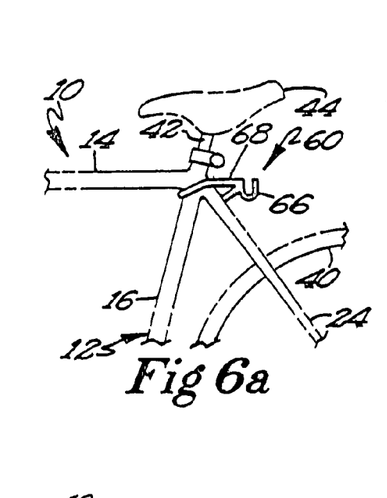
FIGS. 6a-6d illustrate schematically close-up side views of various embodiments of the upper mount.
Figure 6B:
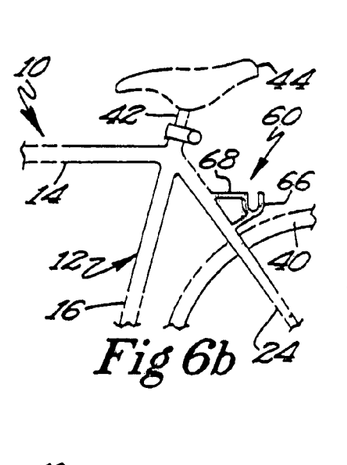
Figure 6C:
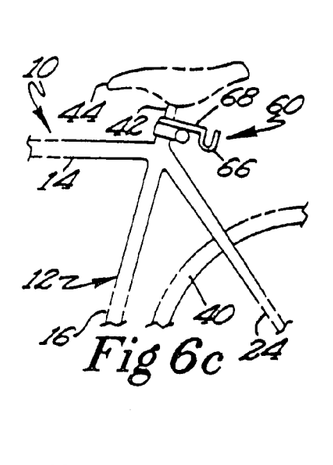
Figure 6D:
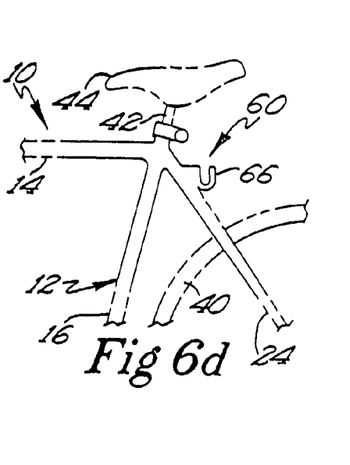
Figure 7A:
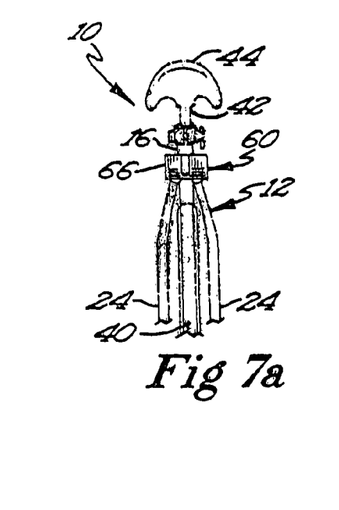
FIGS. 7a-7d illustrate schematically close-up rear views of the embodiments of the upper mount illustrated in FIGS. 6a-6d, respectively.
Figure 7B:
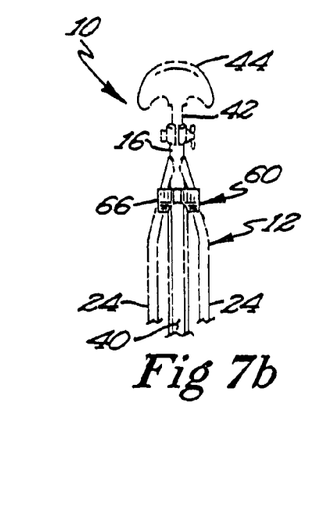
Figure 7C:
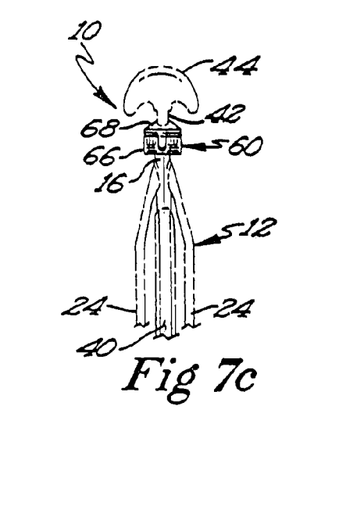
Figure 7D:
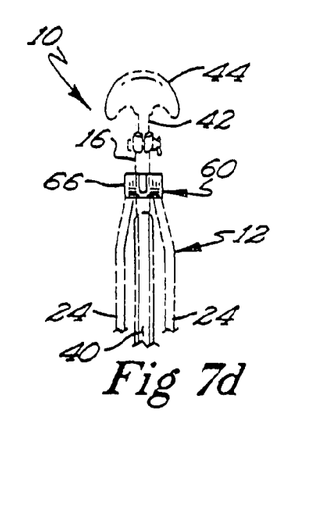

The attachment system of the present invention essentially comprises an upper mount 60 that is secured to the frame 12 at or near the junction between the seat stay 24 and the seat tube 16, one or more accessory mounting posts 62 that extend generally upward from the dropout 28 or 36, and a support arm 64 that may be secured between either the front fork 34 and a bicycle accessory 80 as shown in FIG. 1, or between the seat stay 24 and a bicycle accessory 80 as illustrated in FIGS. 2 and 3. The upper mount 60 is best seen in FIGS. 6a-6d and 7a-7d. The upper mount essentially comprises a trough or channel 66 that is secured to the bicycle frame 12. Preferably, the channel 66 will be secured to the bicycle frame 12 by means of a cantilever arm 68, though it is to be understood that the channel 66 could be affixed directly to the bicycle frame 12. The channel 66 is secured to the cantilever arm 68 preferably as by welding so as to create a unitary structure. The cantilever arm 68 is in turn secured to the bicycle frame 12 by means of welding, where the upper mount 60 is to be formed integrally with the frame 12, or through the use of various types of clamping mechanisms, such as a U-bolt or the like, where the upper mount 60 is to be retrofit to the bicycle frame 12. Note that the upper mount 60 may be retrofit to a bicycle permanently by welding the cantilever arm 68 or the channel 66 directly to the frame 12. Whether the upper mount 60 is formed integrally with the frame 12 or retrofit thereto, it may be desirable to provide an angled support 70 that extends between the cantilever arm 68 or channel 66 and the seat stay 24. Where desirable, a base end of the cantilever arm 68 may be provided with a bore through which the seat tube 42 may pass. Utilizing this embodiment, the upper mount 60 may be supported by the seat tube 42 rather than by the frame 12. As illustrated in FIG. 6a, the upper mount 60 is mounted in such a way as to be substantially aligned with the junction between the seat stay 24 and the seat tube 16; in FIG. 6b, the upper mount 60 is mounted below the junction between the seat stay 24 and the seat tube 16; and in FIG. 6c the upper mount 60 is secured to the seat post 42 of frame 12 above the junction between the seat stay 24 and the seat tube 16. Note that in FIG. 6d, the upper mount comprises only the channel 66 which is secured directly to the frame 12 adjacent the juncture of the seat stay 24 and the seat tube 16, though it is to be understood that the channel 66 could be secured to the frame 12 at any point above or below this junction. In any case, the upper mount 60 is to be secured to the frame 12 in such a manner as to provide a substantially rigid hard point connection to the frame 12 for a bicycle accessory. As used herein, the term "hard point" encompasses substantially rigid attachment structures whereby bicycle accessories may be secured to the frame 12 of the bicycle 10 at a point immediately adjacent the frame 12. By way of simplification, the various figures of the present application illustrate the attachment of an accessory 80 that is a bicycle luggage rack. As used herein, however, the term "accessory" shall be considered to encompass any bicycle accessory that may be secured to the frame 12 of a bicycle 10 including, but not limited, bicycle luggage racks.

Figures 9, 10, 11:
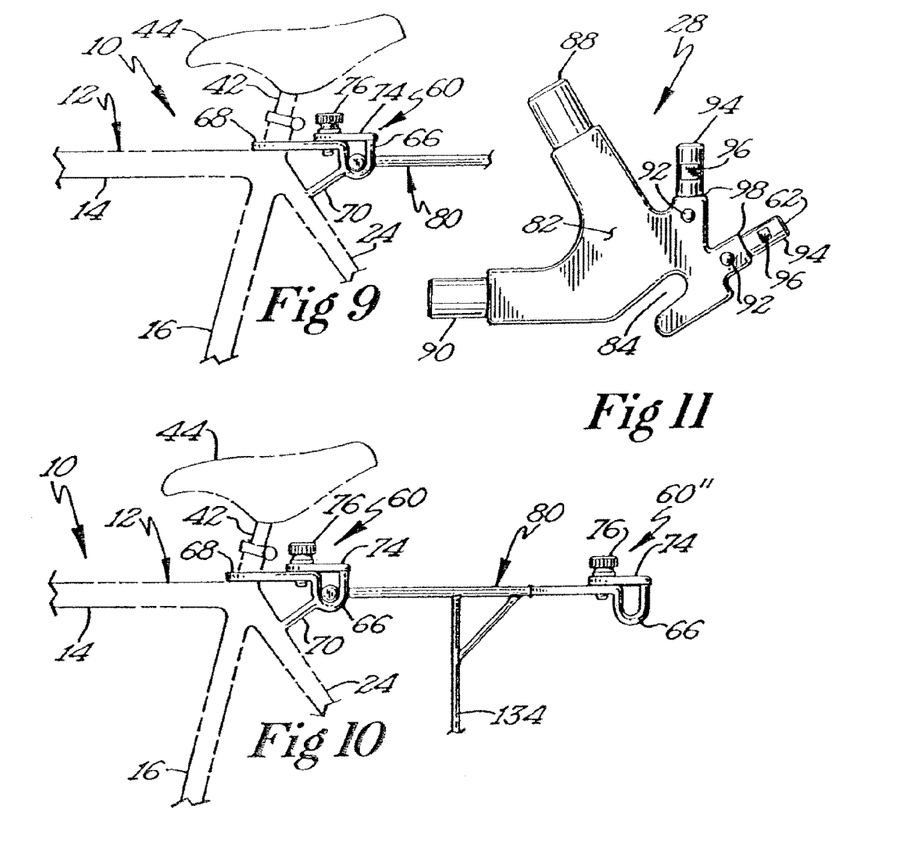
FIG. 9 illustrates schematically a retention mechanism of the upper mount.
FIG. 10 illustrates schematically a bicycle luggage rack that includes a mounting structure similar to that illustrated in FIG. 9.
FIG. 11 is a side view of a bicycle dropout having a pair of mounting posts formed integral therewith.

The channel 66 of the upper mount 60 may have any useful shape. The channel 66 is constructed and arranged to receive therein a member of the bicycle luggage rack 80 so as to secure the rack 80 to the frame 12 of the bicycle 10. Preferably, the channel 66 will be constructed and arranged to receive and retain a portion of the rack 80, in a close fitting engagement therewith. As the portion of a bicycle luggage rack that is to be received by the channel 66 may vary from vendor to vendor, the channel 66 may have a cross-sectional shape as shown in any one of FIGS. 8a-8e. FIG. 8a illustrates a V-shaped channel 66, 8b illustrates a generally rectangular cross-sectional shape for the channel 66, while FIGS. 8c-8e illustrate various circular or oval curvilinear shapes for the channel 66. The bicycle luggage rack 80 may simply rest in the channel 66 or may actually form a snap fit therewith. In any case, it is preferable to provide a retention mechanism that will insure that the bicycle luggage rack 80 is retained within the channel 66 of the upper mount 60. FIG. 9 illustrates one embodiment of a retention mechanism 72.

The retention mechanism 72 illustrated in FIG. 9 comprises a hinged or rotating cover 74 that may be positioned over the open channel 66 of the upper mount 60 so as to retain the bicycle luggage rack 80 therein. A fastener 76 which may be a thumbscrew, a removable pin, or other similar device, secures the cover 74 over the channel 66. The fastener 76 is preferably constructed and arranged such that the bicycle luggage rack 80 may be rapidly mounted or removed from the bicycle frame 12, i.e., is adapted for "quick release" attachment of the bicycle luggage rack 80 to the bicycle frame 12. It is to be understood that any useful retention mechanism capable of implementing the quick-release attachment of the bicycle luggage rack 80 to the bicycle frame 12 may be used in lieu of the retention mechanism 72 illustrated in FIG. 9.

While the upper mount 60 is typically secured to the frame 12 of the bicycle 10, this mounting mechanism may be adapted to secure other accessories 80 to the bicycle luggage rack as shown in FIG. 10. In FIG. 10 the bicycle luggage rack 80 is provided at its rear end with a duplicate upper mount 60" that comprises a channel 66, a cover 74 and a fastener 76 that are adapted to secure a secondary accessory (not shown) to the bicycle luggage rack 80. Note that the provision of a mounting structure 60" on the bicycle luggage rack 80 is an optional feature of the present invention.

As shown in FIG. 1, the bicycle luggage rack 80 is secured to the bicycle frame 12 by means of the upper mount 60 and also by means of the accessory mounting posts 62 that extend generally upward from the dropout 28. The accessory mounting posts 62 can best be seen in FIGS. 11-25. A typical dropout 28 for a rear wheel 40 generally comprises a flat planar structure 82 having a slot 84 formed therein for receiving an axle 86 of a rear wheel 40 of a bicycle 10. The planar structure 82 of the dropout 28 is secured to the seat stay 24 and the chain stay 26 by first and second frame attachment members 88 and 90, respectively. The frame attachment members 88, 90 may take any useful form, but are typically cylindrical or planar. The frame attachment members 88, 90 are adapted to be received within the seat stay 24 and chain stay 26, respectively, either wholly, as where the frame attachment members are cylindrical, or in part, where the frame attachment members are planar. Generally speaking, the frame attachment members 88, 90 are secured to their respective stays 24, 26 by means of welding, though where the stays are formed of a composite material, it is not unusual to use an adhesive to secure the dropout 28 to the frame 12 of the bicycle 10.

The rear dropout as illustrated in FIG. 11 comprises two accessory mounting posts 62. These accessory mounting posts 62 typically extend generally upward away from the surface upon which the bicycle 10 rests, though as can be seen, one or both of the mounting posts 62 may angle rearwardly away from the frame 12 of the bicycle 10 or even forwardly towards the frame 12 (not shown). Threaded holes 92 are provided in the dropout 28 in the approximate location in which a standard prior art braze-on would be provided in a prior art dropout. The combination of the accessory mounting posts 62 with the threaded holes 92 increases the flexibility of the attachment system of the present invention.

The shaft 94 of the mounting posts 62 is preferably planar, i.e., having a flat cross-sectional shape. However, it is to be understood that the mounting posts 62 may be of any useful shape or size, as will be more fully described hereinbelow. Suffice it to say that the shafts 94 of the mounting posts 62 will be adapted to secure an accessory 80 such as the bicycle luggage rack illustrated in FIG. 1 to the bicycle frame 12 at the dropout 28. It may be desirable to form shoulder 98 at the base of the shaft 94 to limit the insertion of the shaft 94 of the mounting posts 62 into an accessory 80, though, by their very nature, the mounting posts 62 will likely be insertable only so far into an accessory 80 as the planar structure 82 of the dropout will limit the insertion of the mounting posts 62 into the accessory 80.

Retention mechanisms of many types may be used to secure an accessory 80 to the mounting posts 62. As can be seen in FIG. 11, the mounting posts 62 may be provided with an engagement structure 96 which may be an indentation, notch, or a bore formed in the shaft 94 of the mounting posts 62. In some circumstances, this engagement structure 96 may be omitted.

Figures 12, 13, 14, 15, 16, 17, 18:
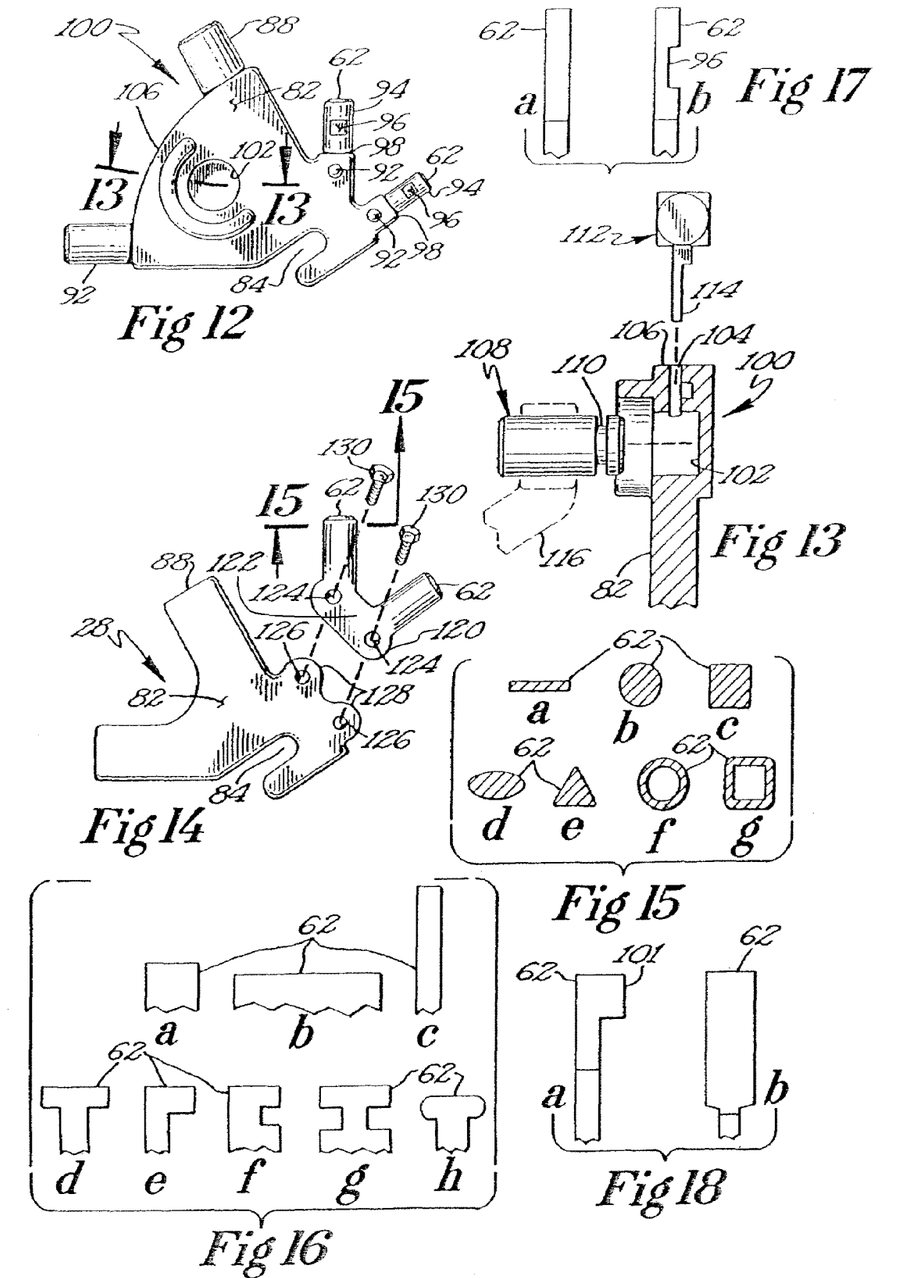
FIG. 12 is a side view of the bicycle dropout of FIG. 9 further comprising a towing hitch structure.
FIG. 13 is a partial cross section of the towing hitch structure as viewed along cutting lines 13-13 of FIG. 12.
FIG. 14 is a side view of a bicycle dropout with a pair of bolt-on mounting posts.

FIG. 12 illustrates a rear dropout 28 of the type illustrated in FIG. 11, but further including a towing hitch structure 100. The towing hitch structure is preferably formed between the frame attachment members 88, 90 and into the planar structure 82 of the dropout 28. The structure of the towing hitch 100 may best be seen in FIG. 13. The towing hitch structure 100 typically comprises a first bore 102 that is formed into the planar structure 82 of the dropout 28 between the frame attachment members 88-90. This first bore 102 may be stopped as shown in FIG. 13, or may pass entirely through the dropout 28. A second bore 104 is formed into the leading edge 106 of the dropout 28 such that the second bore will intersect the first bore 102. The first bore is constructed and arranged so as to receive a hitch pin 108 having a groove or notch 110 formed therein. The second bore 104 of the towing hitch structure 100 is positioned such that when the hitch pin 108 is inserted into the first bore 102 into its towing position, the second bore 104 will be substantially aligned with the groove or notch 110 formed in the hitch pin 108. A locking mechanism 112 may be inserted into the second bore such that its tip 114 will engage the groove 110 of the hitch pin 108, thereby insuring that the hitch pin 108 is retained within the first bore. In its simplest form, the locking mechanism 112 may be spring-actuated so as to bias the tip 114 into a first, extended position that extends into the first bore. By pulling back on this embodiment of the locking mechanism 112, the tip 114 may be removed from the first bore, so as to permit the hitch pin 108 to be inserted therein, or removed therefrom. Where so desired, the locking mechanism 112 may be provided with a security mechanism that would prevent the removal of the hitch pin 108 from the first bore 102 by unauthorized persons. Note that the hitch pin 108 may be used to secure any number of accessories to the bicycle, and more preferably will be secured to a towing arm 116 of a trailer (not shown). It should also be noted that the rear dropouts 28 may be each provided with a towing hitch structure 100 though only a single towing hitch structure 100 is required.

FIG. 14 illustrates an embodiment of the present invention wherein the mounting posts 62 are part of a mounting plate 120. The mounting plate 120 comprises a flat central area 122 having a number of holes 124 formed therethrough. The holes 124 are positioned so as to be coincident with the threaded bores 126 of braze-ons 128 of a typical prior art dropout 28. The mounting plate 120 is affixed to the prior art dropout 28 by means of threaded fasteners 130 that are passed through the holes 124 in the mounting plate 120 and driven into the threaded bores 126 of the braze-ons 128. While the use of threaded fasteners 130 will allow the mounting plate 120 to be removed from the dropout 28, it is preferred that the mounting plate 120 be mounted in a semi-permanent manner, specifically, it is preferred to utilize a thread locking material, locking nuts, spring washers, star washers, or thread-deformers to insure that the threaded fasteners 126 do not fail. Alternatively, the mounting plate 120 can be welded to a braze-on 28 through the holes 124 and around the periphery of the mounting plate 120. Securing the mounting plate 120 to a dropout 28 results in a strong and secure hard point mounting platform for bicycle accessory 80.

FIG. 15 illustrates a number of potential cross-sectional shapes that the mounting posts 62 may in general have. The cross-sectional shapes of FIG. 15 are taken generally along the cutting lines 15-15 as shown in FIG. 14. Note that the shapes illustrated in FIG. 15 may apply to either retrofit type accessory mounting posts 62 such as that shown in FIG. 14, or to integrally formed mounting posts 62 as shown in FIGS. 11 and 12. FIGS. 15*a*-15*g* illustrate cross-sectional shapes that include rectangular, circular, square, oval, triangular, cylindrically hollow, and square-hollow shapes, respectively. FIGS. 16*a*-16*h* illustrate various embodiments of a mounting post 62. FIG. 16*a* is of a square post 62; FIG. 16*b* is of a post 62 having a width greater than its height where as FIG. 16*c* illustrates a post 62 that is taller than it is wide; FIG. 16*d* shows a T-shaped post 62; FIG. 16*e* shows an inverted L-shaped post 62; the post 62 shown in FIG. 16*f* is notched on one side whereas the post of FIG. 16*g* is notched on both sides; and finally, FIG. 16*h* shows a mushroom-shaped post 62.

Other shapes for mounting posts may be seen in FIGS. 17-18. In FIG. 17*a* mounting post 62 is flat. FIG. 17*b* shows a post 62 having a notched engagement structure 96. FIG. 18*a* shows an L shaped post 62 wherein the arm of the "L" shape extends laterally away from the post 62. The extension or projection 101 may be solid, U-shaped, or any other useful shape that allows the post 62 to attach an accessory 80 to the frame 12 of the bicycle 10. FIG. 18*b* shows a generally three dimensional post 62 having a substantial dept. The post 62 of FIG. 18*b* may be cylindrical or prismatic as needed.

Figure 19:
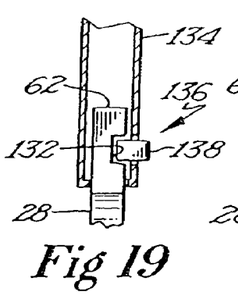
FIG. 19 is a partial cross section of a of a notched mounting post with an accessory leg received thereon.

FIG. 19 illustrates a mounting post 62 a single notch 132 formed therein. The notch 132 and the engagement structure 96 permit a leg 134 of an accessory 80 to be secured to the dropout 28. The term "accessory leg" as used herein refers to any intermediate structure that supports a bicycle accessory 80. An accessory leg 134 may be formed integrally with the accessory 80 as with the bicycle luggage rack illustrated in FIG. 1, or may be simply coupled between the mounting post 62 and the accessory 80. In any case, the accessory leg 134 is not to be considered part of the mounting post 62.

The vertically oriented accessory leg 134 in FIG. 19 has a hollow tip that is constructed and arranged to receive therein the mounting post 62. Note that the interior shape of any accessory leg will be adapted to mate with the mounting post 62. Therefore, where the mounting post 62 is cylindrical, the interior surface of the accessory leg 134 is preferably also cylindrical. It is to be understood, however, that the interior of the accessory leg 134 may be dissimilar in shape from the mounting post 62 with which it mates, provided of course that the accessory leg 134 and the mounting post 62 are able to be secured to one another. Where the mounting posts 62 are hollow, the accessory mounting leg 134 will be constructed and arranged to be received within the mounting posts.

Figure 21:
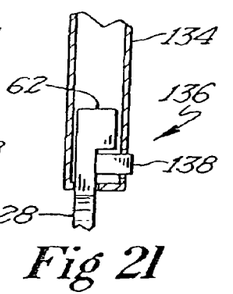
FIG. 21 is a partial cross section of an "L" shaped mounting post with an accessory leg received thereon.
Figure 22:
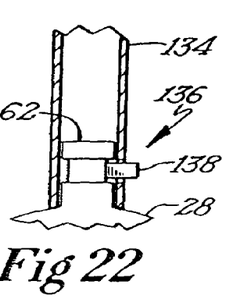
FIG. 22 is a partial cross section of a bicycle dropout having a mushroom shaped mounting post with an accessory leg received thereon.

Accessory leg 134 is preferably provided with a retention mechanism 136 that will engage the notch 132 or engagement structure 96 formed in the mounting posts 62. In FIG. 19 a vertically oriented accessory leg 134 includes a simple spring loaded button 138 that passes through the side wall of the hollow accessory leg 134 to engage the notch 132 in the mounting post 62. The spring loaded button 138 insures that the accessory leg is securely retained over the mounting post 62. FIG. 21 illustrates another accessory mounting leg 134 having a spring loaded button 138 that engages an L-shaped mounting post 62. FIG. 22 illustrates a mounting post 62 having two notches 132 formed therein. The post 62 of FIG. 22 has an accessory leg 134 received thereover, the accessory leg 134 including a spring-loaded button 138 that engages the notches formed in either side of the mounting post 62.

Figures 23, 26, 27:
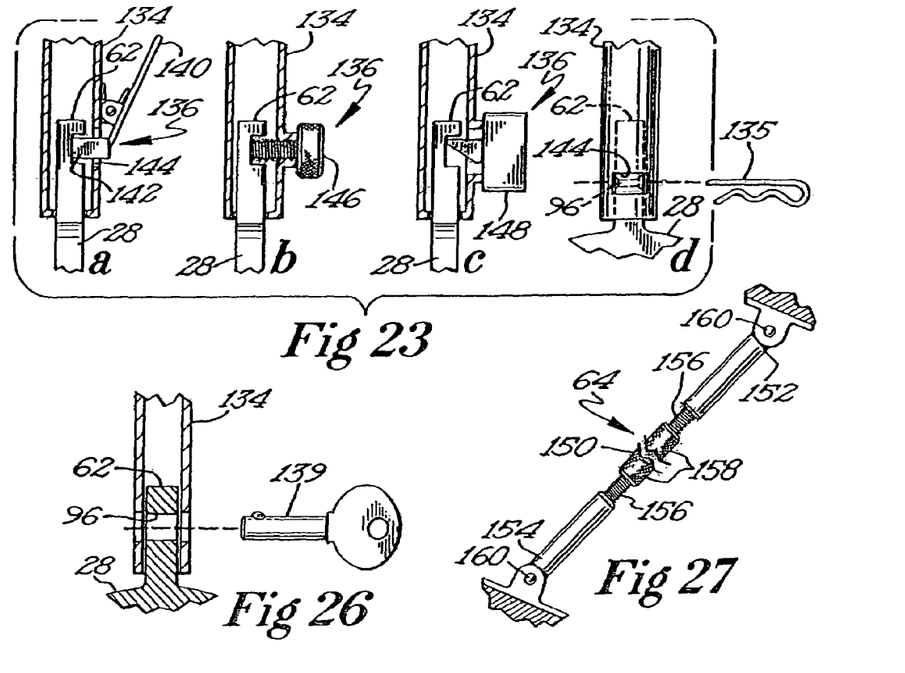
FIG. 26 is a partial cross section of a bicycle dropout having a mounting post with an accessory leg received thereon, the accessory being secured to the mounting post with a removable pin.
FIG. 27 illustrates a support arm of the present invention.
Figure 24:
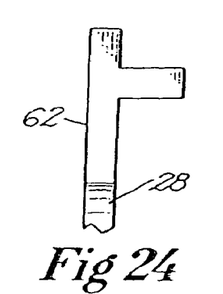
FIG. 24 is a partial end view of a bicycle dropout having a cylindrical "L" shaped mounting post that extends away from the dropout.
Figure 25:
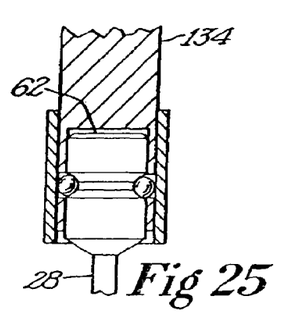
FIG. 25 is a partial cross section of a bicycle dropout having a mounting post with an accessory leg having a captured ball bearing retention device received thereon.

In FIG. 23a, a mounting post 62 has an accessory leg 134 secured thereover by a retention mechanism 136 that comprises a spring-biased lever 140. The tip 142 of the lever 140 passes through a hole 144 in the side of the accessory leg 134 in order to engage the engagement structure 96 formed into the mounting post 62. FIG. 23b shows a thumbscrew 146 threaded through the tip of the accessory leg 134. FIG. 23c shows a simple push button 148 that engages the mounting post 62 to retain the accessory leg 134 thereover. FIG. 23d illustrates a simple cotter pin 135 that passes through the hole 144 in the accessory leg 134 and through the engagement structure 96 (in this case a bore) to secure the accessory leg 134 to the mounting post 62. FIG. 26 is a partial cross section of a bicycle dropout 28 having a mounting post 62 with an accessory leg 134 received thereon, the accessory being secured to the mounting post 62 with a removable pin 139.

Figure 20:
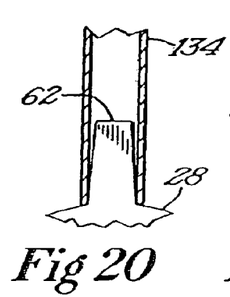
FIG. 20 is a partial cross section of a tapered mounting post with an accessory leg received thereon.

An accessory leg 134 may also be retained on a mounting post 62 by means of an interference type fit. Such a fit may be achieved, as shown in FIG. 20, by providing the mounting post 62 with a tapered width over its height such that the interior surface of the accessory leg 134 will contact the sides of the mounting post 62 so as to form the required interference or friction fit that will retain the accessory leg 134 on the mounting post 62. Other forms of interference fits that will act in lieu of a retention mechanism 136 are well within the ability of one skilled in the art to ascertain, and therefore will not be enumerated herein.

Referring again to FIG. 1, where the attachment system of the present invention comprises an upper mount 60 and one or more mounting posts 62 extending from the rear dropout 28, a bicycle accessory 80 such as the bicycle luggage rack illustrated may be rapidly and securely attached to the frame 12 of the bicycle 10. In attaching the accessory 80 to the frame 12 of the bicycle 10, the accessory legs 134 of the accessory 80 will be coupled to the mounting posts 62 a hereinbefore described. Subsequently, a forward portion of the bicycle rack will be inserted into the channel 66 of the upper mount 60 and retained therein by the retention mechanism 72 of the upper mount 60. The upper mount 60 and the mounting posts 62, whether formed integrally with the frame 12 of the bicycle 10 or retrofit thereto, provide hard point connections for the accessory 80 to the frame 12. Any accessory 80 adapted to utilize the combination of the upper mount 60 and the mounting posts 62 as illustrated in FIG. 1 may be rapidly and securely attached to the frame of the bicycle 12.

In some instances it may not be possible to utilize either the upper mount 60 or the mounting posts 62 on a bicycle frame 12. Where this is the case, either the upper mount 60 or the mounting posts 62 may be omitted in favor of a support arm 64. One embodiment of the attachment system of the present invention comprising an upper mount 60 and a support arm 64 is illustrated in FIG. 2. In FIG. 2 the accessory 80, in this instance a bicycle luggage rack, is attached at its forward end to the upper mount 60 as hereinbefore described. The rear portion of the accessory 80, however, is supported by the support arm 64 which may be seen in more detail in FIG. 27. In general, the support arm 64 comprises a central portion 150 and a first end 152 and a second end 154. In the preferred embodiment of the present invention, the central portion 150 of the support arm 64 will be adjustable in length. This may be enabled by dividing the central portion 150 into two separate telescoping elements or by interposing a threaded bar 156 as illustrated. The threaded bar 156 will preferably have a knob 158 secured thereto such that by rotating the knob 158, the length of the support arm 64 may be modified.

The first and second ends 152, 154 of the support arm 64 need not have any one particular structure associated therewith, as the support arm 64 may need to be modified to accommodate various types of accessories 80. However, a preferred embodiment of the support arm 64 has at its first end a bore 160 that allows the first end 152 of the support arm 64 to be rotatably pinned to an accessory 80. In this way, the support arm 64 will be able to accommodate many different types of accessories 80, including bicycle racks such as those illustrated in FIGS. 1 and 2. The second end 154 of the support arm 64 preferably has a clamp mechanism (not shown) rotatably pinned thereto. The clamp mechanism (not shown) acts to releasably clamp the seat stay therein so as to firmly couple the accessory 80 to the frame 12 of the bicycle 10. Given that the first and second ends 152,154 of the support arm 64 are adapted to accommodate different angular relationships between the bicycle, accessory 80, and support arm 64, it is to be understood that a bicycle accessory 80 can be supported in virtually any attitude.

An alternate embodiment of the second end 154 of the support arm 64 omits the clamping mechanism (not shown) in lieu of a threaded fastener that may be threaded into a typical mounting stud that is used to mount a brake to the seat stay 24 of a bicycle frame 12. This fastener 164 (best seen in FIG. 1) will simultaneously secure the brake components 166 to the seat stay 24 and provide an anchoring position for the second end 154 of the support arm 64. The first end 152 of the support arm 64 may be secured to an accessory 80 such as the bicycle rack in a number of different manners. In FIG. 2, the support arm 64 is used in conjunction with an upper mount 60 and is secured between the seat stay 24 and the framework of the luggage rack that defines the upper surface thereof. In FIGS. 3a-3d, the support arm 64 is used in conjunction with a mounting post 64 that extends from the dropout 28. As can be appreciated, the support arm 64 may be secured to virtually any portion of a bicycle accessory such as a bicycle rack 80. The first end 152 of the support arm 64 may be secured to luggage rack 80 forward of the accessory leg 134, behind the accessory leg, at the junction of the accessory leg 134 and the framework of the luggage rack, or directly to the accessory leg 134 itself. While the first end 152 of the support arm 64 can be secured to the accessory leg 134 anywhere along its height, it is preferred to couple the support arm 64 to the accessory leg 134 adjacent the upper end of the accessory leg 134.

Figures 3B, 3C, 3D, 4:
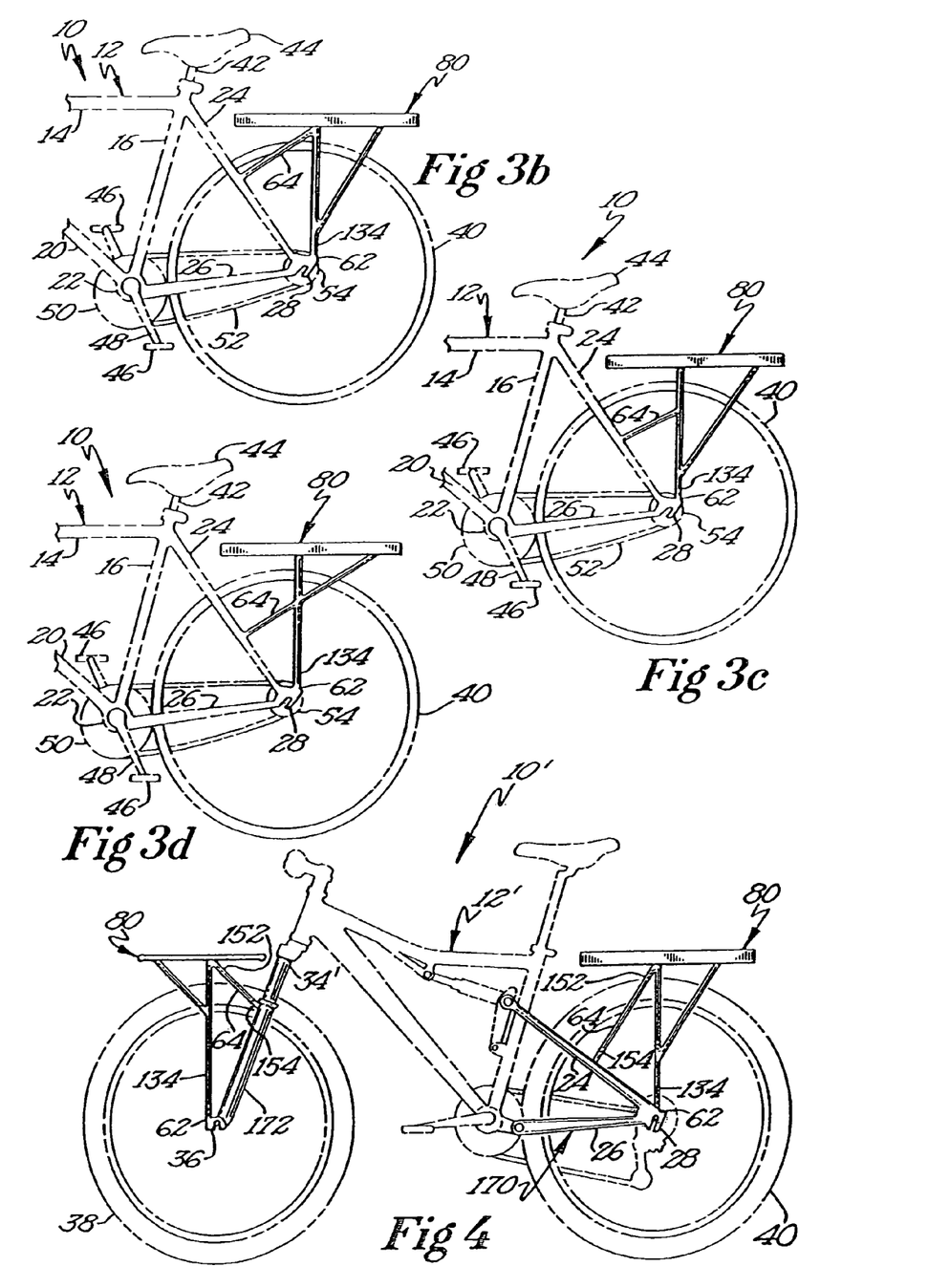
FIG. 3b is partial side view of a bicycle having a bicycle luggage rack secured thereto by means of a support arm and a mounting post, the support arm being connected between the bicycle frame and the bicycle luggage rack at a junction between an accessory mounting leg and the horizontal portion of the bicycle luggage rack.
FIG. 3c is partial side view of a bicycle having a bicycle luggage rack secured thereto by means of a support arm and a mounting post, the support arm being connected between the bicycle frame and an accessory mounting leg of the bicycle luggage rack.
FIG. 3d is partial side view of a bicycle having a bicycle luggage rack secured thereto by means of a support arm and a mounting post, the support arm being connected between the bicycle frame and the rear of a horizontal portion of the bicycle luggage rack.
FIG. 4 is a schematic side view of a fully suspended bicycle having bicycle racks attached over its front and rear wheel by the attachment system of the present invention.
Figures 5, 8:
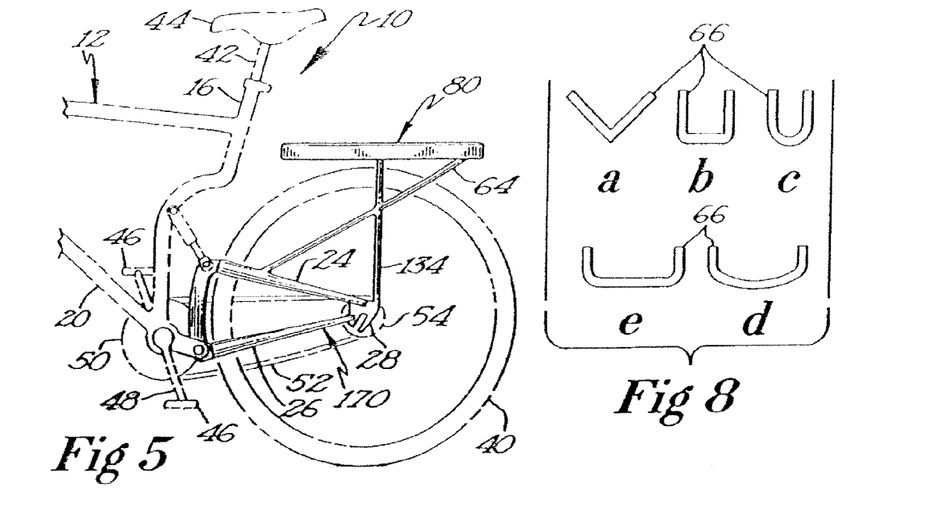
FIG. 5 is a partial schematic side view of a bicycle having a rear suspension with a bicycle luggage rack attached over its rear wheel by the attachment system of the present invention and wherein the bicycle luggage rack is secured thereto by means of a support arm and a mounting post, the support arm being connected between the rear suspension of the bicycle and the rear of a horizontal portion of the bicycle luggage rack.

The use of a support arm 64 and the mounting posts 62 allow accessories 80 such as the luggage rack 80 mounted over the front wheel 38 in FIG. 1. While the bicycle 10 of FIG. 1 is a conventional bicycle having a solid fork 34 and seat and chain stays 24, 26, the support arm 64 also enables a fully suspended bicycle 10' as illustrated in FIG. 4 to have accessories 80 secured thereto. As can be seen in FIG. 5, the seat stay 24 and chain stay 26 form part of a rear suspension 170 that is maintained in a distinct frame of reference from the remainder of the bicycle frame 12'. Similarly, the front fork 34' of the bicycle 10' has a lower portion 172 that is maintained in a separate frame of reference from the remainder of the frame 12'. Fully suspended bicycles 10' such as that illustrated in FIG. 4 are becoming increasingly popular and are being used in situations where accessories such as luggage racks 80 are required. Because the rear and front suspensions 170, 172 are in different frames of reference as the balance of the bicycle frame 12', all attachment points for an accessory 80 must be in the same frame of reference. In FIG. 4, it can be seen that a mounting post 62 is utilized to secure the lower end of an accessory leg 134 to the rear dropout 28. A support arm 64 is coupled between the seat stay 24 of the suspension 170 and the accessory 80. The triangular structure formed between the support arm 64, the seat stay 24, and the accessory leg 134 is substantially rigid and is more than strong enough to support the accessory 80 above the rear wheel 40. In this arrangement, the accessory 80 will be maintained in the same frame of reference as the wheel 40 and the suspension 170 to which the wheel 40 is coupled. FIG. 5 illustrates a support arm 64 that is attached to the accessory rack 80, behind the accessory mounting leg 134.

Similarly, a mounting post 62 may be utilized to secure a lower end of an accessory leg 134 to the front dropout 36. The support arm 64 has its first end pinned to the accessory 80 and its second end 154 coupled to a fastener 164 that is threaded into a mounting stud (not shown) associated with the brake mechanism 166 of the front wheel 38. Again, the structural shape created by the relationship between the support arm 64, the accessory leg 134 and the suspension 172 is substantially rigid and supports the accessory 80 in the same frame reference as the wheel 38 is maintained by the front suspension 172.

Figure 28:
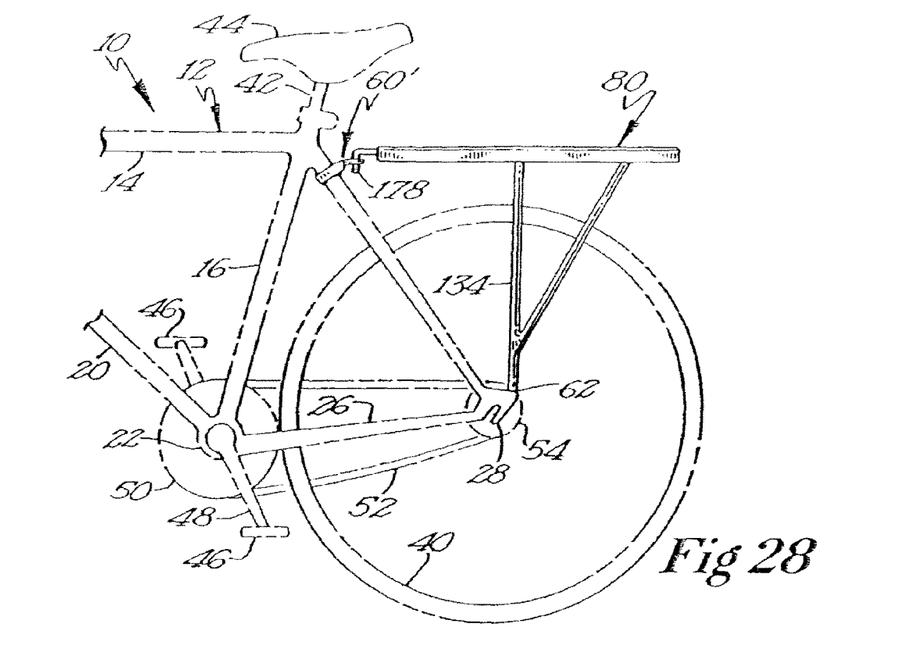
FIG. 28 is a partial side view of a bicycle frame having a bicycle rack secured thereto by an alternate embodiment of the upper mount and a mounting post; and, FIG. 29 is a perspective close up view of the alternate embodiment of the upper mount of FIG. 28.
Figure 29:
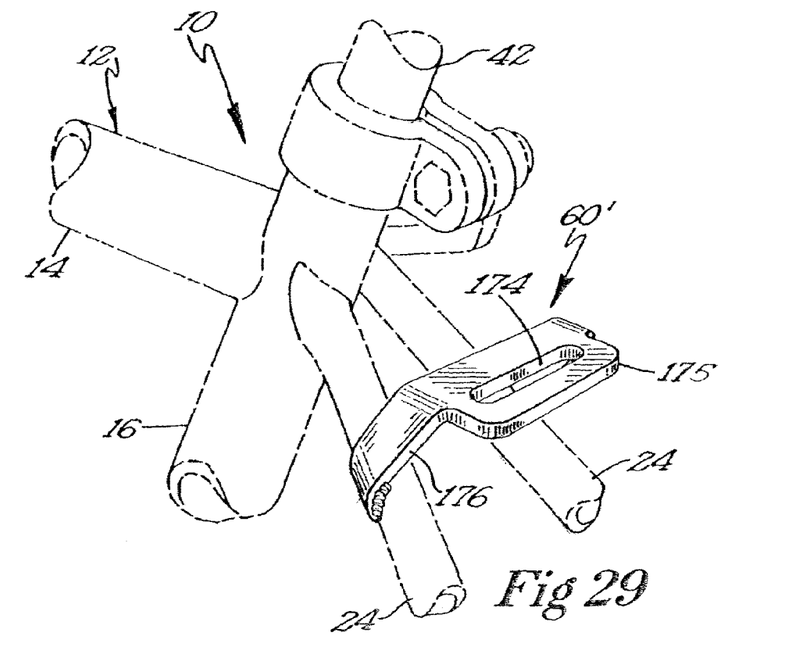

FIGS. 28 and 29 illustrate an alternate embodiment of the upper mount 60. Upper mount 60' comprises a plate 175 having a slot 174 formed therein. The plate 175 is supported on a pair of legs 176 that are preferably welded directly to the seat stay 24, though it is to be understood that these legs 176 could be bolted to the seat stays 24. An accessory 80 such as a bike rack as shown in FIG. 28 is provided with a tongue 178 that mates with the slot 174 so as to secure the upper end of the accessory 80 to the bicycle frame 12.

The attachment system of the present invention offers a flexible and secure means for securing many types of accessories 80 to many types of bicycle frames 12. The attachment system at a minimum includes any two of the upper mount 60, the mounting post 62, and the support arm 64. In addition, the attachment system may also include the towing hitch structure 100. It is to be understood that the upper mount 60, the mounting posts 62, and the support arm 64 may be further modified to accommodate additional accessories as the case may be. One example is to provide wire races passing through the upper mount, mounting post, or support arms to power electronic components such as lights or computers.

The present invention provides many major benefits. A multiplicity of accessories, in a variety of combinations, may be attached to the rear and/or front of a bicycle. Attachment and removal is easy and fast and changing bicycling requirements may be quickly accommodated. In addition, the apparatus is adaptable to nearly all bicycles presently being made.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A system for attaching an accessory to a bicycle frame comprising:
    a bicycle accessory mounting mechanism for use with a bicycle dropout, the bicycle dropout having a planar structure with a slot for receiving a bicycle wheel axle and a first and a second frame attachment structure for securing the planar structure to the bicycle frame, the bicycle accessory mounting mechanism comprising a plate and being operatively configured to secure to the bicycle dropout, the bicycle accessory mounting mechanism further comprising a post that extends away from the plate, the post being shorter than an outer radius of a wheel mounted in the bicycle; and
    the accessory being a bicycle accessory that is quickly-releasable from the post.

2. The system of claim 1 wherein the post is operatively configured to accept and retain an accessory leg of the bicycle accessory.

3. The system of claim 2 wherein the post comprises a retention mechanism formed into the post for enabling a positive connection between the accessory leg and the post.

4. The system of claim 3 wherein the retention mechanism is selected from a group consisting of a notch, a bore, a protrusion extending away from the bicycle frame, and a protrusion extending in a plane defined by the bicycle frame.

5. The system of claim 1 wherein the post is operatively configured to attach the quickly-releasable bicycle accessory to the bicycle frame.

6. The system of claim 1 wherein the bicycle accessory mounting mechanism is mounted to the bicycle dropout in a semi-permanent manner with a technique selected from a group consisting of threaded fasteners, thread locking material, locking nuts, spring washers, star washers, thread deformers, and welded braze-ons.

7. The system of claim 1 wherein the bicycle accessory is selected from a group consisting of a bicycle rack, a fender, a tow hitch, training wheels, a pannier support, a child seat, a basket, a generator, and a motor.

8. The system of claim 1 further comprising a mechanism, formed into an accessory leg of the bicycle accessory, constructed and arranged to mate with a retention mechanism, formed into the post, so as to releasably secure the accessory leg to the post.

9. The system of claim 8 wherein the mechanism formed into the accessory leg is selected from a group consisting of a captured resiliently biased ball, a resiliently biased lever having a free end, a spring biased button, a pin, and a thumbscrew.

10. The system of claim 1 wherein the bicycle accessory comprises an accessory leg having an interior bore constructed and arranged to fit over the post utilizing an interference fit.

11. The system of claim 1 further comprising an upper mount spaced apart from the dropout of the bicycle frame.

12. The system of claim 11 wherein the upper mount is secured to a location adjacent to the bicycle frame selected from a group consisting of: (i) proximate to a junction between a seat stay and a seat tube, (ii) proximate to a junction between a seat post and the seat tube, (iii) on the seat post, (iv) on the seat tube, (v) on the seat stay, and (vi) on the bicycle frame.

13. A system for attaching a bicycle accessory to a front fork of a bicycle frame, the system comprising:
a lower mount being operatively configured to be secured proximate to a front dropout of the bicycle frame, the lower mount comprising a post integrally formed with the front dropout that extends generally outward from the dropout of the bicycle frame and forms a hard point attachment for a portion of the bicycle accessory, the post being shorter than an outer radius of a wheel mounted in the dropout.

14. The system of claim 13 wherein the post is operatively configured to accept and retain an accessory leg of the bicycle accessory.

15. The system of claim 14 wherein the post comprises a retention mechanism formed into the post for enabling a positive connection between the accessory leg and the post.

16. The system of claim 15 wherein the retention mechanism is selected from a group consisting of a notch, a bore, a protrusion extending away from the bicycle frame, and a protrusion extending in a plane defined by the bicycle frame.

17. The system of claim 13 wherein the post is operatively configured to attach a quickly-releasable bicycle accessory to the bicycle frame.

18. The system of claim 13 further comprising the bicycle accessory and wherein the bicycle accessory is operatively configured to be quickly-releasable from the post.

19. The system of claim 18 further comprising a mechanism, formed into an accessory leg of the bicycle accessory, constructed and arranged to mate with a retention mechanism, formed into the post, so as to releasably secure the accessory leg to the post.

20. The system of claim 19 wherein the mechanism formed into the accessory leg is selected from a group consisting of a captured resiliently biased ball, a resiliently biased lever having a free end, a spring biased button, a pin, and a thumbscrew.

21. The system of claim 18 wherein the bicycle accessory is selected from a group consisting of a bicycle rack, a fender, a pannier support, a child seat, a basket, a generator, and a motor.

22. The system of claim 18 wherein the bicycle accessory comprises an accessory leg having an interior bore constructed and arranged to fit over the post utilizing an interference fit.

23. The system of claim 18 further comprising an upper mount spaced apart from the front dropout of the bicycle frame.

24. The system of claim 13 further comprising an upper mount spaced apart from the front dropout of the bicycle frame.

25. The system of claim 24 wherein the upper mount is secured to a location adjacent to the bicycle frame selected from a group consisting of: (i) proximate to a handlebar, (ii) proximate to a headset, (iii) proximate to the front fork, (iv) on the front fork, (v) proximate to a front suspension, and (vi) proximate to a front brake mechanism.

26. A quickly-releasable bicycle accessory for attachment to a post mounted proximate to a dropout of a bicycle frame, the bicycle accessory comprising a mechanism, formed into an accessory leg of the bicycle accessory, constructed and arranged to mate with a retention mechanism, formed into the post, so as to releasably secure the accessory leg to the post, the accessory leg comprising an interior bore constructed and arranged to fit over the post utilizing an interference fit.

27. The quickly-releasable bicycle accessory of claim 26 wherein the bicycle accessory is selected from a group consisting of a bicycle rack, a fender, a pannier support, a child seat, a basket, a generator, and a motor.

28. A quickly-releasable bicycle accessory for attachment to a post mounted proximate to a dropout of a bicycle frame, the bicycle accessory comprising a mechanism, formed into an accessory leg of the bicycle accessory, constructed and arranged to mate with a retention mechanism, formed into the post, so as to releasably secure the accessory leg to the post, the retention mechanism being selected from a group consisting of a captured resiliently biased ball, a resiliently biased lever having a free end, a spring biased button, a pin, and a thumbscrew.

29. The quickly-releasable bicycle accessory of claim 28 wherein the bicycle accessory is selected from a group consisting of a bicycle rack, a fender, a pannier support, a child seat, a basket, a generator, and a motor.

* * * * *